(No Model.)
R. SCHARFE.
ROLLER BEARING.
No. 563,943.                                  Patented July 14, 1896.
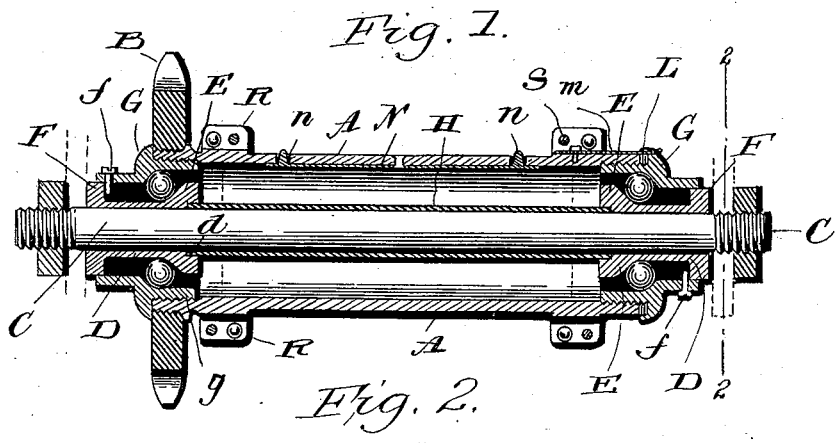
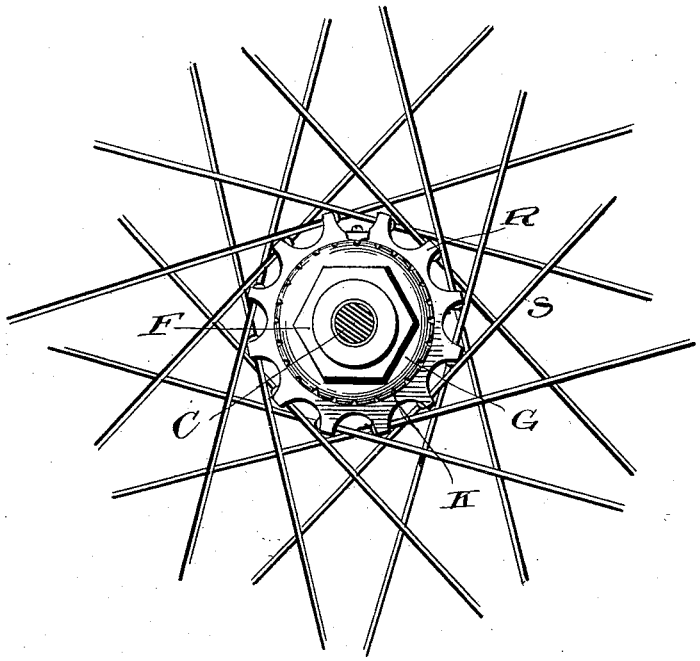
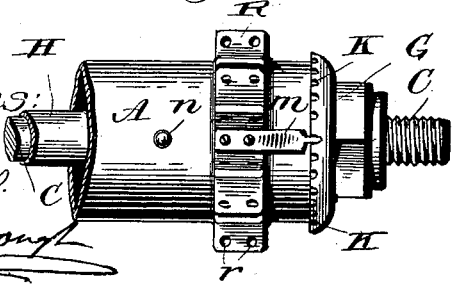
Witnesses:                                    Inventor:
L. C. Hills.                                  Robert Scharfe
Franklin H. Hough                             by
                                              A. L. Hough
                                              Atty.
THE NORRIS PETERS CO., PHOTO-LITHO., WASHINGTON, D. C.

UNITED STATES PATENT OFFICE.

ROBERT SCHARFE, OF AURORA, ILLINOIS.

ROLLER-BEARING.

SPECIFICATION forming part of Letters Patent No. 563,943, dated July 14, 1896.

Application filed April 6, 1896. Serial No. 586,399. (No model.)

*To all whom it may concern:*

Be it known that I, ROBERT SCHARFE, a citizen of the United States, residing at Aurora, in the county of Kane and State of Illinois, have invented certain new and useful Improvements in Roller-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in bicycles, and especially to an improved hub and bearings; and it is the aim of my invention to produce a hub carrying suitable bearings which are so arranged within a cup and held together when it is necessary to remove same from the hub for any purpose.

The invention relates, further, to a peculiar construction and arrangement of the spokes, in which a direct pull is effected on the head of the spoke and the length of the spoke at right angles to its head. Another feature of the invention resides in the manner of adjustment of the ball-bearings, which are carried in removable cups, which cup may be adjusted to take up wear by screwing in the cup against removable rings, and then the provision of a spring-bar for holding the cup in its adjusted position. In connection with this feature of my invention I provide a hollow cylindrical member which is mounted on the axle of the hub and which bears against the bearing-boxes to hold same in position.

To these ends, and to such others as the invention may pertain, the same consists, further, in the novel construction, combination, and adaptation of the parts, as will be hereinafter more fully described, and then specifically defined in the appended claim.

I clearly illustrate my invention in the accompanying drawings, which, with the letters of reference marked thereon, form a part of this specification, and in which drawings similar letters of reference marked indicate like parts throughout the several views, in which—

Figure 1 is a vertical central longitudinal view through the hub embodying my invention. Fig. 2 is an end elevation of the hub, showing manner of attachment of the spokes. Fig. 3 is a detail view of a portion of a hub, showing the manner of adjustment of the bearings and the series of apertures for holding the spokes.

Reference now being had to the details of the drawings by letter, A designates the barrel of the hub, to one end of which is carried the sprocket-wheel B, and C is the axle of the wheel. D is a bearing member which has one end tapering or beveled, as seen at E, and its opposite end flanged at F, and G is an annular sleeve, which is provided to hold the balls of the bearing in place, the said balls being held against the angled portion of the member D by the sleeve at its curved portion, there being a similar bearing member and sleeve at each end of the hub. The inner end of the said sleeve G is screw-threaded about its contracted circumference and is adapted to be screwed into the cylinder of the hub, as seen at $g$. The members D are carried on the axle, and H is a cylinder which is carried on the axle, the ends of which cylinder bear against the ends of the members D against a shoulder in an annular recess in the inner ends of each member at $d$.

The sleeve G, at each end of the hub, is prevented from working over the flange F by means of a screw $f$, passed through an aperture in said sleeve, and the balls interposed between the two inclined bearing-surfaces of the member D and sleeve G are prevented from coming out while the screw $f$ is held in place.

The flanged portion of the sleeve G on the right-hand side has a series of notches or recesses K about its inner edge, and L L are washers which are interposed between the said flange and the end of the hub-cylinder, and M is a spring-bar, the free end of which is adapted to register in the recesses K to hold the sleeve G in its adjusted position. When it is desired to regulate the bearing to take up wear on the bearings, one of the rings L may be removed, the sleeve screwed in, and the spring-bar will register with the recess on the flange which is opposite its end, thus securely holding the sleeve from turning in either direction.

For lubricating the interior of the hub I provide the apertures $n$, in which are held the lugs carried on the spring-bar N, secured to the inner wall of the hub. About the outer circumference of the said hub, near each end, is a series of ridges R between each, and each ridge has two apertures $r$, in which are carried the spokes S, the two spokes held in each ridge being disposed in opposite directions, so that the pull on the spoke will be direct against the head thereof, which is an essential feature of my invention, the length of the spoke being at right angles to the engaging face of the head of the spoke. From this construction the strain is more evenly distributed, and the spokes will wear much longer than where otherwise connected.

Having thus described my invention, what I claim to be new, and desire to secure by Letters Patent, is—

In a bicycle-hub, the combination, with the hollow hub-cylinder having the sleeves screwed in each end thereof, the bearing members D mounted on an axle C, the inner wall of one end of each bearing member inclined, the balls interposed between each member D and one of the sleeves, the screws $f$ designed to be passed through apertures, one in each sleeve, the inner ends of the said screws bearing against the flanges F of the bearing member, and the cylinder H carried on the axle, the ends of the cylinder bearing against the inner ends of the members D, substantially as shown and described.

In testimony whereof I affix my signature in presence of two witnesses.

ROBERT SCHARFE.

Witnesses:
WILLIAM J. WALTER,
J. L. DICKES.